United States Patent Office 3,133,908
Patented May 19, 1964

3,133,908
PROTECTION OF PROTEINS AGAINST DENATURATION BY FLUORINATED ALIPHATIC COMPOUNDS
Howard B. Klevens, 6801 McPherson Blvd., Pittsburgh, Pa.
No Drawing. Filed Sept. 1, 1959, Ser. No. 837,324
17 Claims. (Cl. 260—112)

This invention relates to the binding of completely fluorinated or partially fluorinated aliphatic acids, alcohols, alcohol derivatives, and amines, and salts thereof, with proteinaceous materials to form fluoro compound-protein complexes, and more particularly relates to the protection of proteinaceous materials against heat denaturation and denaturation with urea and other chemical substances. In addition, this invention relates to a method for the purification of proteinaceous materials by the removal of proteinaceous and nonproteinaceous contaminants, the fractionation of a mixture of proteinaceous materials and the separation of two or more proteinaceous materials by means of the formation of fluoro compound-protein complexes, the precipitation of the complexes or contaminants, and subsequent removal of the completely fluorinated or partially fluorinated aliphatic acid, alcohol or amine, or salts thereof, from the complexes.

Heretofore it has been shown that the lower fatty acid anions, when present in low concentrations in solutions of human serum albumin, exert a marked stabilizing effect against coagulation of the protein by heat. This effect was also observed to increase with increasing chain length of the fatty acid anion, maximum stabilizing being attained with salts of fatty acids having seven to eight carbon atoms in the chain, and in a concentration of about 0.15 molar. Above this concentration, gel formation occurred, and below this concentration stabilization was found to increase with increase of chain lengths up to twelve carbon atoms in a chain, the effect falling off with increase of concentration. The diminishing efficacy of the higher fatty acid salts above a chain length of eight carbon atoms was considered as probably due to the denaturing effects of substances with detergent properties. Dodecyl sulfate was observed to cause denaturation of serum albumin but to have stabilizing effect in low concentrations similar to that produced by laurate ion. As the concentration of fatty acid salts with a carbon chain of seven or more atoms was increased, a point was reached at which a cloud no longer formed, but instead a clear gel resulted at elevated temperatures. It has been reported that the circumstances which protect albumin from heat denaturation do not act the same way to protect other proteins. The thermal stability of solutions of 10–20 gm. percent of serum gamma-globulin, as measured by the time for gel formation, was decreased by the addition of caprylate or mandelate. Diphtheria toxin, diphtheria antitoxin, and papain were also rendered more heat-labile by caprylate. In contrast to the effect of anions, cations with non-polar groups were found to increase the susceptibility of serum albumin to heat denaturation. At a pH of seven to eight, additions of dodecylamine and hexylamine hydrochloride to 25 gm. percent solutions of bovine serum albumin decreased the cloud point temperature in proportion to the concentration of the amine. 0.15 molar solutions produced decreases of 10° C. and 40° C. respectively. At a pH of 4.3, the presence of 0.05 molar hexylamine in a 25 gm. percent solution of bovine serum albumin had no thermal stabilizing effect.

The presence of additional carboxyl groups was found to decrease the protective action of an aliphatic acid, sodium succinate and fumarate being far less effective than propionate and butyrate. Trichloroacetate, which in the acid state has been used as a protein precipitant, was found to increase the thermal stability of albumin and its effect was similar in degree to the effect of caproate, while monochloroacetate was much less effective as a protectant than trichloroacetate although more effective than acetate.

Trifluoroacetic acid has been reported to be a new reagent for precipitating muco and other proteins.

Anionic detergents were found to combine with proteins, even on the alkaline side of the isoelectric point, and the properties of the resultant complex showed a striking dependence on the detergent/protein weight ratio, rather than on absolute detergent concentration. Such detergents produced a profound change in molecular structure resulting in the denaturation of proteins. Although precipitation of proteins by detergents was shown to be confined to regions in which the protein and detergent carried charges of opposite sign, combinations of anion detergents and protein persisted on the alkali side of the isoelectric point. The relative efficacy of homologous series of various anionic detergents on egg albumin and beta-lactoglobulin was studied and sulfate and sulfonate derivatives containing more than eight carbon atoms were found to be protein precipitants. Electrophoretic analysis revealed that one precipitation with sodium dodecyl sulfate achieved only partial separation of the components of a syntheic mixture of purified albumin and globulin buffered in the isoelectric region. Journal of Biological Chemistry 153, 589 (1944); Journal of Biological Chemistry 159, 111 (1945); Journal of Biological Chemistry 162, 181 (1946); Journal of Biological Chemistry 167, 407 (1947); Advance in Protein Chemistry, Vol. IV, 1948, pages 79–122 and Discussions of the Faraday Society, No. 13, page 251 (1953).

It is an object of this invention to form a complex of a proteinaceous material with a completely fluorinated or partially fluorinated aliphatic acid, alcohol, alcohol derivative, or amine, or salts thereof; and, as well, to precipitate such complexes.

It is another object of this invention to remove water soluble, nonproteinaceous contaminants from a proteinaceous material by the formation and precipitation of a fluoro compound-protein complex at the isoelectric point or in a pH region in which the fluoro compound carries a charge of opposite sign to the residual charge on the protein, and removal of the fluoro compound from the precipitated complex.

It is another and further object of this invention to remove water insoluble, nonproteinaceous contaminants from a proteinaceous material by the formation of a solution of a fluoro compound-protein complex in a pH region in which the fluoro compound carries a charge of the same sign as the residual charge on the protein, removal of precipitated contaminant and recovery of the protein from the complex.

It is still another object of this invention to completely separate two or more proteinaceous materials by forming fluoro compound-protein complexes with a completely fluorinated or partially fluorinated aliphatic acid, alcohol, alcohol derivative, or amine, or a salt thereof, fractionally precipitating the complexed proteinaceous materials and removing the fluoro compounds.

It is a still further object of this invention to form a complex of a proteinaceous material with a completely fluorinated or partially fluorinated aliphatic acid, alcohol, alcohol derivative, or amine, or salts thereof, which may be heated to an elevated temperature without heat denaturation of the protein and which, in the presence of urea or other substances capable of denaturing proteins, protects the protein from denaturation.

The objects of this invention are accomplished and a method for the protection of proteinaceous materials against heat denaturation and denaturation by urea and other chemical substances is provided by the formation of a complex of a proteinaceous material with a completely fluorinated or partially fluorinated aliphatic acid, alcohol, alcohol derivative, or amine, or salts thereof.

The fluoro compound-protein complex may be heated to and maintained at elevated temperatures of the order of from about 60° C. up to about 120° C., without denaturation of the protein. The presence in a solution of the fluoro compound-protein complex of urea or other chemicals which otherwise would cause denaturation of the protein does not cause denaturation of the protein.

The further objects of this invention are accomplished and a method for purifying proteinaceous materials by the removal of proteinaceous and non-proteinaceous contaminants, the fractionation of a mixture of proteinaceous materials and the separation of two or more proteinaceous materials is provided by binding completely or partially fluorinated, aliphatic acids, alcohols, alcohol derivatives, or amines, or salts thereof with proteinaceous materials to form fluoro compound-protein complexes followed by removal of insoluble impurities and the separation of the fluoro compound from the proteinaceous material or precipitation of a complex or a series of complexes, removal of individual precipitated complexes, and separation of the fluoro compound from the complexes, the proteinaceous material being recovered in an undenatured state.

Upon the addition to a solution of a protein of a completely fluorinated or partially fluorinated aliphatic compound or a salt thereof, which is present in solution as an anion or cation with a non-polar group, a fluoro compound-protein complex is formed. A complex of a completely fluorinated or partially fluorinated aliphatic acid or a salt thereof, or a partially fluorinated alcohol derivative, or a salt thereof is soluble above the isoelectric point of the protein. Adjusting the pH of the solution to a point at or below the isoelectric point of the protein results in flocculation and precipitation of the complex. A complex of a fluorinated alcohol or a fluorinated aliphatic amine, or a salt of the fluorinated amine with a proteinaceous material is soluble at a pH above and below the isoelectric point of the protein. In the case of a complex of a protein with a fluoro acid or a salt thereof or a fluoro alcohol derivative or a salt thereof, buffered at a pH above the isoelectric point of the protein and in the case of a complex of a protein with a fluoro alcohol, fluoro amine or fluoro amine salt, buffered at a pH below the isoelectric point of the protein, the fluoro compound-protein complex may be heated to an elevated temperature without denaturation of the protein. The protein may be recovered in an undenatured state from a solution of the fluoro compound-protein complex containing urea or other substances which would otherwise cause denaturation of the protein.

The fluoro compound may be removed from a precipitated complex or a solution of the complex by dilution with a large volume of water or a suitable aqueous buffer solution, by dialysis against water or a suitable aqueous buffer solution, or by treating a solution of the complex with an appropriate ion-exchange resin. If a precipitated complex is diluted with or dialyzed against an aqueous solution buffered at a pH above or below the isoelectric point of the protein, a solution of the protein is recovered substantially free from the fluoro compound.

Completely fluorinated and partially fluorinated aliphatic compounds, having at least two carbon atoms up to twelve carbon atoms providing in aqueous solution an anion or a cation with a non-polar group, are suitable for use in the practice of this invention. Specific classes of fluorinated compounds which are suitable for use in the practice of this invention include: aliphatic acids, including the perfluoro alkanoic acids, perfluoro butyric acid, perfluoro caproic acid, perfluoro caprylic acid, perfluoro capric acid, and perfluoro lauric acid, and the corresponding acids in which an omega-fluorine atom is replaced with a hydrogen atom, and salts of such acids; alpha-dihydroperfluoro aliphatic alcohols having from at least two carbon atoms and up to twelve carbon atoms and their salts; derivatives of partially fluorinated aliphatic alcohols having the formula $ROSO_3H$ in which R is a fluoro alkyl radical having at least two carbon atoms and up to twelve carbon atoms, such as fluoro butyl, caproic, caprylic, capric, and lauric radicals, and their salts; alkyl sulfate salts having the formula $ROSO_3X$ in which X is a metal salts having the formula $ROSO_3X$ in which X is a metal or an ammonium radical and R is a fluoro alkyl radical having at least two carbon atoms, and up to twelve carbon atoms, such as fluoro butyl, caproic, caprylic, capric, and lauric radicals; alkyl sulfonic acids having the formula $RSO_3H$ in which R is a fluoro alkyl radical having at least two carbon atoms and up to twelve carbon atoms such as butyric, caproic, caprylic, capric, and lauric radicals, and their salts; the alpha-dihydroperfluoro aliphatic amines having from two to twelve carbon atoms, and their salts; derivatives of phosphoric acid such as mono- and di- trihydroperfluoroalkyl phosphates in which the cation may be an ammonium ion or an alkali metal ion, such as ammonium mono- and di-(1,1,7-trihydroperfluoroheptyl) phosphates, and ammonium mono- and di-(1,1,9-trihydroperfluorononyl) phosphates; and mixed chlorofluoroalkanoic acids and their salts, such as 2,3-dichloroperfluorobutyric acid and 2,4,5-trichloroperfluorocaproic acid and their salts. Salts of such fluoro compounds including alkali metal and ammonium salts of the fluoro aliphatic acids, alcohols, and alcohol derivatives and hydrochloride, hydrobromide, sulfate, and phosphate salts of the fluoro aliphatic amines are particularly suitable for use in the process of this invention.

The following example illustrates the formation of a complex of a completely fluorinated aliphatic acid with bovine serum albumin.

It is preferred that the aliphatic fluoro compounds have not more than twelve carbon atoms since the solubility of aliphatic fluoro compounds having more than twelve carbon atoms is so low that there is only a small amount of fluoro compound-protein complex formed which results in a low order of protection of the proteinaceous material against denaturation.

*Example I*

Two cc. of a one percent by weight aqueous solution of bovine serum albumin buffered with an acetate buffer at a pH of 5.8 and having an ionic strength of 0.1, were placed in a cellophane casing one-half inch in diameter. The casing containing the protein solution was placed in twenty cc. of 0.5 percent by weight aqueous solution of perfluorocaprylic acid, buffered at a pH of 5.8 with an acetate buffer and having an ionic strength of 0.1. The flask was maintained at a temperature of 25° C. and shaken for two hours, the time necessary for equilibration. The dialysate was analyzed for perfluorocaprylate ion by measurement of the surface tension, the difference in free ion and original ion concentration being the amount of perfluorocaprylate ion complexed with the bovine serum albumin. Fifty-four molecules of perfluorocaprylate ion were complexed with each molecule of bovine serum albumin. Sufficient acetate buffer of pH 4.3 and ionic strength of 0.1 was added to the contents of the cellophane casing to bring the pH thereof to 4.8. A precipitate of the complex formed as soon as the pH was lowered to 4.88, the isoelectric point of bovine serum albumin. The cellophane casing containing the precipitated complex was dialyzed against 55 cc. of aqueous acetate buffer solution having a pH of 5.8 and an ionic strength of 0.1 until free from perfluorocaprylate ion. The bovine serum albumin was completely in solution and a precipitin test showed it to be undenatured.

In the system, one percent bovine serum albumin-perfluoro caprylic acid, binding of the acid or its salts with bovine serum albumin is independent of the pH of the solution up to twenty-eight to twenty-nine molecules of acid per molecule of protein. Binding in excess of twenty-eight to twenty-nine molecules of perfluoro caprylic acid per molecule of bovine serum albumin is dependent upon the concentration of the fluoro compound, the pH, and ionic strength of the solution. As the ionic strength of the solution is increased, binding in excess of twenty-eight to twenty-nine molecules of perfluoro caprylic acid per molecule of bovine serum albumin is decreased. The number of bound perfluoro caprylic acid molecules, in excess of twenty-eight to twenty-nine per molecule of bovine serum albumin, decreases markedly as the protein concentration of the solution is increased. The maximum number of perfluoro caprylic acid molecules bound per molecule of bovine serum albumin, in a one percent by weight solution of the protein having an ionic strength of 0.1, is about forty when the pH of the solution is not more than about one unit below the isoelectric point, and about eighty when the pH of the solution is not more than about one unit above the isoelectric point.

In general, at lower anionic fluoro compound concentrations, binding with proteins is independent of pH; at higher anionic fluoro compound concentrations, the fluoro compound-protein mol ratio is of higher order when the pH is above the isoelectric point than when the pH of the solution is below the isoelectric point of the protein. Similarly, at low fluoro compound concentrations the fluoro compound-protein mol ratio is independent of ionic strength; at higher fluoro compound concentrations the fluoro compound-protein mol ratio decreases with increase in ionic strength. The degree of binding of a fluoro compound with a protein is substantially independent of temperature within the approximate range of 0° to 50° C.

The following experiments illustrate the effect of the concentration of perfluoro caprylic acid on the acid-protein ratio in the complex.

*Example II*

A series of cellophane casings, each containing two cc. of one percent aqueous bovine serum albumin solution, buffered at a pH of 5.8 with acetate buffer and having an ionic strength of 0.1, were each immersed in 20 cc. of an aqueous solution, buffered at the same pH, containing perfluorocaprylic acid, the concentration of fluoro acid being varied. The flask containing the solution of fluoro acid and the cellophane casing immersed therein were maintained at a temperature of 25° C. and shaken for two hours. The dialysate in each flask was analyzed for perfluorocaprylate ion by measuring the surface tension. The results of the experiments are given below in tabular form.

| Molar concentration of acid: | Molecules of acid bound per molecule of protein |
|---|---|
| 0.0227 | 69 |
| 0.0176 | 66 |
| 0.011 | 56.5 |
| 0.0088 | 49.5 |
| 0.0066 | 37.0 |
| 0.0044 | 24.3 |
| 0.0022 | 12.7 |
| 0.001 | 4.5 |

*Example III*

A series of cellophane casings, each containing two cc. of one percent bovine serum albumin solution, buffered at a pH of 4.6 with acetate buffer and having an ionic strength of 0.1, were each immersed in twenty cc. of an aqueous solution buffered at the same pH, having the same ionic strength and containing perfluorocaprylic acid, the concentration of fluoro acid in the series of flasks being varied. The flasks containing the solution of perfluorocaprylic acid and the cellophane casing immersed therein were maintained at a temperature of 25° C. and shaken for two hours. The dialysate in each flask was analyzed for perfluorocaprylate ion by measuring the surface tension. The results of the experiments are given below in tabular form.

| Molar concentration of acid: | Molecules of acid bound per molecule of protein |
|---|---|
| 0.0148 | 38 |
| 0.01185 | 36 |
| 0.00889 | 37 |
| 0.00594 | 28 |
| 0.00296 | 16 |
| 0.00148 | 8.5 |
| 0.00074 | 4.0 |

*Example IV*

Two cc. of a one percent bovine serum albumin solution, buffered with acetate buffer at a pH of 4.6 and having an ionic strength of 0.1 were placed in a cellophane casing one-half inch in diameter. The casing was immersed in twenty cc. of an aqueous solution of 0.5 percent perfluorocaprylic acid, buffered at a pH of 4.6 with acetate buffer and having an ionic strength of 0.1. The flask containing the fluoro acid solution and the cellophane casing was maintained at a temperature of 25° C. and shaken for two hours. Bovine serum albumin complex was present in the cellophane casing in the form of a precipitate. Anaylsis of the dialysate by surface tension measurement showed that thirty-six molecules af perfluorocaprylic acid per molecule of bovine serum albumin was present in the complex. The cellophane casing containing the precipitated complex was dialyzed against fifty cc. of aqueous acetate buffer solution having a pH of 4.6 and an ionic strength of 0.1. During dialysis the bovine serum albumin was redissolved. A precipitin test demonstrated that the bovine serum albumin was undenatured.

If the fluoro aliphatic acid-bovine serum albumin complex contains no more than about two to three molecules of acid per molecule of bovine serum albumin and the pH of the solution of bovine serum albumin is below the isoelectric point, no precipitation occurs. If the ratio of fluoro acid to bovine serum albumin is above two to three molecules per molecule of bovine serum albumin, the complex is precipitated when the pH of the bovine serum albumin is below the isoelectric point.

At a pH below the isoelectric point of the protein used in forming the fluoro compound-protein complex, the amount of fluoro aliphatic acid required for the complex to precipitate decreases with an increase in the molecular weight of the acid.

The amount of bound fluoro aliphatic acid in the complex increases with an increase in the concentration and decreases wth an increase in molecular weight of the acid, and this is illustrated by Example V.

*Example V*

A series of dialysis experiments were conducted in the same way as in Example I, using a series of perfluoro aliphatic acids of varying concentration, each buffered at a pH of 4.3 and having an ionic strength of 0.1 and one percent aqueous bovine serum albumin solution buffered at the same pH and having the same ionic strength. The results of the experiments are given in tabular form below, the values in column three being the minimum acid-protein mol ratio necessary for precipitation of the complex.

| Acid | Molar concentration of acid | Minimum acid-protein mol ratio necessary |
|---|---|---|
| Perfluorobutyric acid | 0.085 | 150–1 |
| Perfluorocaproic acid | 0.011 | 50–1 |
| Perfluorocaprylic acid | 0.006 | (3–4)–1 |
| Perfluorocapric acid | 0.00035 | 2–1 |

The following example illustrates the effect of an increase in concentration of bovine serum albumin on the amount of perfluoro aliphatic acid bound in the complex, and the effect of an increase in the concentration of the perfluoro aliphatic acid on the amount of acid bound in the complex.

*Example VI*

A series of cellophane casings, one-half inch in diameter, each containing two cc. of bovine serum albumin solution, buffered with an acetate buffer at a pH of 5.8 and having an ionic strength of 0.1 were each immersed in a flask containing twenty cc. of a perfluorocaprylic acid solution buffered at a pH of 5.8 with acetate buffer and having ionic strength of 0.1. The flask containing the acid solution and the cellophane casings were maintained at a temperature of 25° C. and shaken for two hours. The dialysate was analyzed for perfluorocaprylate ion by measurement of the surface tension, the difference in free ion and original ion concentration present in the dialysate being the amount of perfluoro caprylate ion complexed with the bovine serum albumin. The results of the experiments are given below in tabular form, in which the mol ratio of acid to protein present in the complex is given in column three.

| Concentration of acid solution in percent by weight | Concentration of protein solution in percent by weight | Minimum acid-protein mol ratio necessary |
|---|---|---|
| 0.2 | 0.5 | 47-1 |
| 0.2 | 1.0 | 23-1 |
| 0.2 | 2.0 | 12-1 |
| 0.2 | 4.0 | 7-1 |
| 0.5 | 0.5 | 100-1 |
| 0.5 | 1.0 | 52-1 |
| 0.5 | 2.0 | 28-1 |
| 0.5 | 4.0 | 14-1 |

Other proteins such as ovalbumin, bovine gamma-globulin, beta-lactoglobulin, urease, gelatin, and human serum albumin have a binding capacity for a fluoro compound similar to that observed for bovine serum albumin, and this similarity is present both above and below the isoelectric point of the protein.

The maximum binding in the case of perfluorocaprylic acid approaches a saturation value which is a function both of the limit of the acid solubility, one percent by weight, and the acid binding capacity of a particular protein. For one percent protein solutions, the maximum binding, at a pH of 5.8 and ionic strength of 0.1, for bovine serum albumin, beta-lactoglobulin, urease, gelatin, ovalbumin and human serum albumin is 80, 25, 235, 30, 35, and 78 moles of acid per molecule of protein, respectively. The maximum binding for a one percent by weight solution of bovine gamma-globulin, buffered at a pH of 7.5, and having ionic strength of 0.1, is 145 moles of perfluorocaprylic acid per molecule of bovine gamma-globulin.

Perfluoro compounds, which are completely miscible with water, form complexes with proteins and establish an equilibrium between the fluoro compound bound to the protein and free fluoro compound in the aqueous solution. The first eighty molecules of such fluoro compounds bound to a molecule of bovine serum albumin, the protein being present in a concentration of one percent and the solution having a pH of 5.8 and an ionic strength of 0.1, follows a typical adsorption isotherm. Additional binding occurs, but to a much smaller degree, with increase in concentration of the fluoro compound. Upon the addition of a 0.5 percent by weight aqueous solution of perfluorocaproic acid, a one percent by weight aqueous solution of perfluorobutyric acid, a 2.2 percent by weight aqueous solution of perfluoropropionic acid, and a 0.7 percent by weight aqueous solution of omega-hydroperfluorovaleric acid, each buffered at a pH of 5.8 with acetate buffer and having an ionic strength of 0.1, to a one percent by weight aqueous solution of bovine serum albumin, buffered with acetate buffer at a pH of 5.8 and having an ionic strength of 0.1, more than eighty molecules of the fluoro acid are bound to a molecule of bovine serum albumin. The maximum binding of perfluorocaprylic acid, perfluorocapric acid, perfluorolauric acid, omega-hydro-pelargonic acid, omega-hydro-undecoic acid, and omega-hydro-tridecoic acid, upon the addition of saturated aqueous solution of the acids, buffered at a pH of 5.8 of acetate buffer and having an ionic strength of 0.1, to a one percent by weight aqueous solution of bovine serum albumin buffered with acetate buffer at a pH of 5.8 and having an ionic strength of 0.1, is 80, 10, 6, 33, 8, and 4 moles of acid per mole of bovine albumin serum, respectively.

As the chain length of fluoro compound is increased, the total amount of fluoro compound ion necessary to effect complete precipitation of the protein is markedly decreased. The action of omega-hydro-perfluoro compound ions in binding and precipitation does not differ substantially from the action of completely fluorinated compound ions. There is a decrease in binding with progressive replacement of fluorine atoms with hydrogen atoms and the decrease is particularly marked if the fluorine atoms adjacent to the carboxyl group of fluoro aliphatic acids are replaced with hydrogen atoms. The binding of the alcohols, the salts of the alcohols and alcohol derivatives is similar to that for the fluoro acids and their salts. There is a similar binding in the case of fluoro aliphatic amines and their salts except that no precipitation of the fluoro compound-protein complex occurs at the isoelectric point, or at a pH above the isoelectric point when the chain length of the fluoro amines and their salts is six carbon atoms or less.

The following examples illustrate the formation of a complex of various fluorinated aliphatic acids with proteins and protection of the fluoro acid-protein complex against heat denaturation.

*Example VII*

A series of cellophane casings, one-half inch in diameter, each containing two cc. of a one percent by weight aqueous bovine serum albumin solution buffered with acetate buffer at a pH of 5.8 and having an ionic strength of 0.1, were each immersed in twenty cc. of an aqueous solution containing a fluoro compound; such as a perfluoro aliphatic acid having two to twelve carbon atoms, a salt of a perfluoro aliphatic acid having two to twelve carbon atoms, an omega-hydro perfluoro aliphatic acid, a salt of an omega-hydro perfluoro aliphatic acid, a 1,1-dihydro perflouor alkyl sulfonic acid, a salt of a 1,1-dihydro perfluoro alkyl sulfonic acid, a 1,1-omega-trihydrofluoro alkyl sulfonic acid, a perfluoro alkane sulfuric acid, a salt of a perfluoro alkane sulfuric acid, a completely halogenated aliphatic acid, a salt of a completely halogenated aliphatic acid, and an ammonium salt of a mono- and di-(1,1-omega-trihydro perfluoro alkyl) phosphate. The solution of fluoro compound was buffered at the same pH with acetate buffer and had the same ionic strength as the protein solution. The solutions were maintained at a temperature of 25° C. and stirred for at least two hours in order that equilibrium be established and the fluoro compound-protein complex formed. The cellophane casings were removed from the acid solution and the solution of the complex was transferred to glass tubes and heated over a period of two hours, during which time the temperature of the contents was elevated gradually from room temperature to 105° C. or until flocculation of the protein was observed. If flocculation was not observed before a temperature of 105° C. was reached, the glass tubes were sealed so that at least ten percent of the volume of the tube was not filled. The sealed tubes were then placed in a bath at 100° C. over a period of two hours and the solution was observed for flocculation. The results of the experiments are given below in tabular form.

| Acids and salts | Concentration of acid solution in percent by weight | Flocculation temperature, °C. |
|---|---|---|
| Perfluorobutyric acid | 2.0 | 83 |
| Perfluorocaproic acid | 1.0 | 92 |
| Perfluorocaprylic acid | 1.0 | ¹120 |
| Perfluorocapric acid | 0.1 | ¹120 |
| Perfluorolauric acid | 0.01 | ¹120 |
| Omega-hydroperfluorovaleric acid | 1.0 | 81.5 |
| Omega-hydroperfluorooenanthic acid | 2.0 | 95 |
| Omega-hydroperfluoropelargonic acid | 1.0 | ¹120 |
| Omega-hydroperfluoroundecoic acid | 0.1 | ¹120 |
| Trifluoroacetic acid | 2.5 | 90 |
| Potassium perfluorobutyrate | 2.0 | 85 |
| Sodium perfluorobutyrate | 2.0 | 87 |
| Ammonium perfluorobutyrate | 2.0 | 83 |
| Potassium perfluorocaproate | 1.0 | 93 |
| Sodium perfluorocaproate | 1.0 | 97 |
| Ammonium perfluorocaproate | 1.0 | 94 |
| Potassium perfluorocaprylate | 0.5 | ¹120 |
| Sodium perfluorocaprylate | 0.5 | ¹120 |
| Ammonium perfluorocaprylate | 0.5 | 116 |
| Potassium perfluorocaprate | 0.1 | ¹120 |
| Sodium perfluorocaprate | 0.1 | ¹120 |
| Ammonium perfluorocaprate | 0.1 | ¹120 |
| Potassium perfluorolaurate | 0.005 | ¹120 |
| Sodium perfluorolaurate | 0.005 | ¹120 |
| Ammonium perfluorolaurate | 0.01 | ¹120 |
| Potassium omega-hydroperfluorovalerate | 2.0 | 83 |
| Sodium omega-hydroperfluorovalerate | 2.0 | 85 |
| Ammonium omega-hydroperfluorovalerate | 2.0 | 80 |
| Potassium omega-hydroperfluoroheptylate | 1.0 | 95 |
| Sodium omega-hydroperfluoroheptylate | 1.0 | 100 |
| Ammonium omega-hydroperfluoroheptylate | 1.0 | 93 |
| Potassium omega-hydroperfluoropelargonate | 1.0 | ¹120 |
| Sodium omega-hydroperfluoropelargonate | 1.0 | ¹120 |
| Ammonium omega-hydroperfluoropelargonate | 1.0 | ¹120 |
| Potassium omega-hydroperfluoroundecanoate | 0.1 | ¹120 |
| Sodium omega-hydroperfluoroundecanoate | 0.1 | ¹120 |
| Ammonium omega-hydroperfluoroundecanoate | 0.1 | ¹120 |
| 1,1-dihydroperfluorocaprysulfonic acid | 1.0 | ¹120 |
| Potassium 1,1-dihydroperfluorocaprysulfonate | 1.0 | ¹120 |
| Sodium 1,1-dihydroperfluorocaprysulfonate | 1.0 | ¹120 |
| Ammonium 1,1-dihydroperfluorocaprysulfonate | 1.0 | ¹120 |
| 1,1,7-trihydroperfluoroheptylsulfonic acid | 1.0 | ¹102 |
| Potassium 1,1,7-trihydroperfluoroheptylsulfonate | 1.0 | ¹103 |
| Sodium 1,1,7-trihydroperfluoroheptylsulfonate | 1.0 | ¹105 |
| Ammonium 1,1,7-trihydroperfluoroheptylsulfonate | 1.0 | 99 |
| 1,1,9-trihydroperfluorononylsulfonic acid | 0.5 | ¹120 |
| Potassium 1,1,9-trihydroperfluorononylsulfonate | 0.5 | ¹120 |
| Sodium 1,1,9-trihydroperfluorononylsulfonate | 0.5 | ¹120 |
| Ammonium 1,1,9-trihydroperfluorononylsulfonate | 0.5 | ¹120 |
| Ammonium mono- and di-(1,1,7-trihydroperfluoroheptyl) phosphate | 0.1 | 85 |
| Ammonium mono- and di-(1,1,9-trihydroperfluorononyl) phosphate | 0.1 | 90 |
| Ammonium di-(1,1,9-trihydroperfluorononyl) phosphate | 0.1 | 93 |
| Perfluorooctane sulfuric acid | 0.1 | ¹120 |
| Potassium perfluorooctane sulfate | 0.1 | ¹120 |
| Ammonium perfluorooctane sulfate | 0.1 | ¹120 |
| 2,3-dichloroperfluorobutyric acid | 3.0 | 85 |
| Potassium salt of above acid | 3.0 | 87 |
| Sodium salt of above acid | 3.0 | 86 |
| Ammonium salt of above acid | 3.0 | 82 |
| 2,4,5-trichloroperfluorocaproic acid | 1.0 | 102 |
| Potassium salt of above acid | 1.0 | 103 |
| Sodium salt of above acid | 1.0 | 105 |
| Ammonium salt of above acid | 1.0 | 103 |
| 2,4,6,7-tetrachloroperfluorocaprylic acid | 0.2 | 112 |
| Potassium salt of above acid | 0.2 | 115 |
| Sodium salt of above acid | 0.2 | 115 |
| Ammonium salt of above acid | 0.2 | 110 |
| 2,4,6,8,9-pentachloroperfluorocapric acid | 0.1 | ¹120 |
| Potassium salt of above acid | 0.1 | ¹120 |
| Sodium salt of above acid | 0.1 | ¹120 |
| Ammonium salt of above acid | 0.1 | ¹120 |

¹ No flocculation.

A one percent by weight aqueous solution of bovine serum albumin buffered at a pH of 5.8 and having an ionic strength of 0.1 flocculate at a temperature of 65° C.

The series of experiments of Example VII was repeated except that heating of each tube was discontinued when the contents had reached a temperature just below the above observed flocculation temperature or just below 120° C. if no flocculation had been observed in the corresponding tube in Example VII. The contents of each tube were cooled and dialyzed against a tenfold volume of an aqueous buffer solution having the same pH and ionic strength as the protein solution and fluoro compound solution. The undenatured state of the protein obtained was demonstrated by paper electrophoresis and precipitin tests. Paper electrophoresis provided a pattern for the heated protein corresponding to the pattern of the original protein, and the precipitin test showed that the heated protein was undenatured.

Proteins recovered from fluoro compound-protein complexes which had been heated to an elevated temperature below the flocculation temperature were in an undenatured form.

*Example VIII*

Two cc. portions of one percent by weight aqueous solutions of bovine gamma-globulin, egg albumin and beta-lactoglobulin, buffered at a pH of 7.55, 5.8, and 5.8, respectively, and having ionic strengths of 0.2, 0.1, and 0.5, respectively, were placed in separate cellophane casings, one-half inch in diameter. Each casing was immersed in a separate flask containing twenty cc. of an aqueous solution of a fluoro compound or a salt of a fluoro compound, buffered at the same pH, and having the same ionic strength as the protein solution. The temperature of the flasks was maintained at 25° C. and the flasks were shaken for two hours. The content of each cellophane casing was transferred to a separate Pyrex tube. The tubes were sealed and the temperature of the solution was gradually raised. The tubes were observed for flocculation of the protein. The results of the experiments are given below in tabular form, the temperatures in columns 3, 4 and 5 being those at which flocculation was first observed.

| Fluoro compound | Concentration of fluoro compound in percent by weight | Bovine gamma-globulin, °C. | Egg albumin, °C. | Beta lactoglobulin, °C. |
|---|---|---|---|---|
| Perfluorocaprylic acid | 0.5 | ¹120 | 110 | 110 |
| Potassium perfluorocaproate | 1.0 | 90 | 85 | 87 |
| Potassium perfluorocaprate | 0.1 | 105 | 100 | 98 |
| Potassium omega-hydroperfluoroundecanoate | 0.1 | ¹120 | 110 | 110 |
| Potassium 1,1,9-trihydroperfluorononyl sulfonate | 0.5 | ¹120 | 110 | 110 |
| Potassium perfluorooctane sulfate | 0.1 | ¹120 | 108 | 110 |
| Potassium 2,3-dichloroperfluorobutyrate | 3.0 | 87 | 80 | 82 |
| Potassium 2,4,5-trichloroperfluorocaprate | 1.0 | 105 | 89 | 93 |
| Potassium 2,4,6,7-tetrachloroperfluorocaprylate | 0.2 | 115 | 108 | 110 |

¹ No flocculation.

One percent by weight aqueous solutions of bovine gamma-globulin, egg albumin and beta-lactoglobulin, buffered at a pH of 7.55, 5.8, and 5.8 and having ionic strengths of 0.2, 0.1 and 0.5, respectively, flocculate at 68° C., 61° C., and 62° C., respectively.

The following experiment illustrates the effect on the flocculation temperature of an increase in the concentration of the fluoro acid solution.

*Example IX*

A series of sixteen cellophane casings, one-half inch in diameter, each containing two cc. of a one percent by weight aqueous bovine serum albumin solution, eight being buffered at a pH of 5.8 and eight being buffered at a pH of 4.0 and each having anionic strength of 0.1, were each immersed in twenty cc. of an aqueous solution containing a fluoro compound; such as a fluorinated aliphatic amine, a salt of a fluorinated aliphatic amine, and a mono-substituted perfluoroaliphatic-amide. The solution fluoro compound was buffered at the same pH with acetate buffer and had the same ionic strength as the protein solution. The solutions were maintained at a temperature of 25° C. and shaken for two hours. The content of each cellophane casing was transferred to a separate Pyrex tube. The tubes were sealed and the temperature of the solution was gradually raised. The tubes were observed for flocculation of the protein. The results of the experiments are given below in tabular form, the temperatures being those at which flocculation was first observed.

| Fluoro compound | Concentration of fluoro compound solution in percent by weight | Flocculation temperature for solutions buffered at— | |
|---|---|---|---|
| | | pH 5.8 | pH 4.0 |
| | | °C. | °C. |
| 1,1-dihydroperfluorobutyl ammonium chloride | 1 | 61 | 78 |
| 1,1-dihydroperfluorohexyl ammonium chloride | 1 | 59 | 80 |
| $C_7F_{15}CONHC_3H_6N(CH_3)_3I$ | 0.1 | 58 | 86 |
| $C_7H_{15}CONHC_3H_6N(CH_3)_2C_2H_5I$ | 0.1 | 57 | 88 |
| $C_7F_{15}CONHC_2H_4N(C_6H_5)\cdot Cl$ | 0.1 | 57 | 90 |
| $C_9F_{19}CONHC_3H_6N(CH_3)_3I$ | (¹) | 60 | 87 |
| $C_7F_{15}CONHC_3H_6N(CH_3)_2C_{10}H_{21}Br$ | (¹) | 61 | 87 |
| $C_7F_{15}CONHC_3H_6N(CH_3)_2$ | (¹) | 60 | 86 |

¹ Saturated.

A one percent by weight aqueous solution of bovine serum albumin buffered at a pH of 4.0 and having an ionic strength of 0.1 flocculates at a temperature of 65° C.

The above results show that the flocculation temperature of the protein is raised if the pH of the solution is below the isoelectric point of the protein but lowered if the pH of the solution is above the isoelectric point of the protein in instances where a fluorinated amine, amine salt or substituted amide is used to form the fluoro compound-protein complex.

*Example X*

Two cc. portions of one percent by weight aqueous solutions of bovine serum albumin, egg albumin and beta-lactoglobulin, buffered at a pH of 4.0, and having ionic strengths of 0.1, 0.1, and 0.5, respectively, were placed in separate cellophane casings, one-half inch in diameter. Each casing was immersed in a separate flask containing twenty cc. of a saturated aqueous solution of a fluorinated alcohol, buffered at the same pH, and having the same ionic strength as the protein solution. The temperature of the flasks was maintained at 25° C. and the flasks were shaken for two hours. The content of each casing was transferred to a separate Pyrex tube. The tubes were sealed and the temperature of the tubes was gradually raised. The tubes were observed for flocculation of the protein. The results of the experiments are given below in tabular form, the temperature being that at which flocculation was first observed.

| Fluoro compound | Bovine serum albumin, °C. | Ovalbumin, °C. | Beta-lactoglobulin, °C. |
|---|---|---|---|
| 1,1-dihydroperfluorohexanol | 85 | 79 | 80 |
| 1,1,7-trihydroperfluoroheptanol | 85 | 80 | 80 |
| 1,1,9-trihydroperfluorononanol | 87 | 78 | 82 |

One percent by weight aqueous solutions of bovine serum albumin, ovalbumin, and beta-lactoglobulin, buffered at a pH of 4.0 and having ionic strengths of 0.1, 0.1, and 0.5, respectively, flocculate at 62° C., 58° C. and 59° C., respectively.

The experiments of this example were repeated except the protein and fluorinated alcohol solutions were buffered at a pH of 5.8. The flocculation temperatures for bovine serum albumin, ovalbumin and beta-lactoglobulin were not greater than 65° C., 61° C., and 62° C., respectively.

*Example XI*

A series of experiments were made in the same manner as in Example VII using increasing concentrations of perfluorocaprylic acid in the acid solution which was buffered at a pH of 5.8 with acetate buffer and had an ionic strength of 0.1. In all experiments the protein solution was two cc. of a one percent by weight aqueous solution of bovine serum albumin, buffered at a pH of 5.8 with acetate buffer and having an ionic strength of 0.1. The results of the experiments are given below in tabular form.

| Concentration of acid in mols per liter: | Flocculation temperature, °C. |
|---|---|
| 0.001 | 92 |
| 0.002 | ¹ 120 |
| 0.0044 | ¹ 120 |
| 0.0066 | ¹ 120 |
| 0.011 | ¹ 120 |

¹ No flocculation.

The following example illustrates the effect of an increase in concentration of a protein solution on the degree of protection against heat denaturation provided by bound fluoro acid.

*Example XII*

Two cc. of a ten percent by weight aqueous solution of bovine serum albumin, buffered with acetate buffer at a pH of 5.8 and having ionic strength of 0.1, and contained in a cellophane casing, one-half inch in diameter, were immersed in twenty cc. of a 0.001 molar aqueous solution of perfluorocaprylic acid, buffered with acetate buffer at a pH of 5.8 and having an ionic strength of 0.1. The acid solution was maintained at a temperature of 25° C. for two hours with agitation. The contents of the cellophane casing were placed in a Pyrex tube and sealed, leaving ten percent of the volume of the tube unfilled. The tube was gradually heated to a temperature of 120° C., at which temperature there was no flocculation.

The degree of protection against heat denaturation, as evidenced by the temperature of flocculation is increased as the pH of the protein solution is increased above the isoelectric point and also varies with the type of buffer used.

The following example illustrates the effect on the degree of protection against heat denaturation provided by a bound perfluoro acid of an increase in pH above the isoelectric point of the protein.

*Example XIII*

Two cc. of a one percent by weight aqueous solution of bovine serum albumin, buffered with phosphate buffer at a pH of 6.5 and having an ionic strength of 0.1, and two cc. of a one percent by weight aqueous solution of bovine serum albumin, buffered with phosphate buffer at a pH of 7.5 and having an ionic strength of 0.1, each contained in a separate cellophane casing one-half inch in diameter, were each immersed in twenty cc. of a one percent by weight solution of perfluorocaproic acid buffered with phosphate buffer at pH of 6.5 and 7.5 respectively, and both having an ionic strength of 0.1. The acid solutions were maintained at a temperature of 25° C. with stirring for two hours and the contents of the cellophane casings were then sealed in Pyrex tubes, leaving ten percent of the volume of the tube unfilled, and the tubes were heated until fluocculation was observed. The contents of the tube buffered at a pH of 6.5 showed flocculation at 100° C. The contents of the tube buffered at a pH of 7.5 showed no flocculation at 120° C.

As the ionic strength of the protein solution and the acid solution is increased, the concentration of acid remaining the same, the flocculation temperature is lowered. The following example shows the effect of an increase in ionic strength on the flocculation temperature.

*Example XIV*

A series of cellophane casings, one-half inch in diameter, each containing two cc. of a one percent by weight aqueous bovine serum albumin solution, buffered at a pH of 5.8 and having increasing ionic strengths, were each immersed in twenty cc. of a 0.1 percent by weight aqueous solution of perfluorocaprylic acid, buffered at a pH of 5.8 with acetate buffer and having increasing ionic strengths, the ionic strength of the acid solutions corresponding to the ionic strength of the protein solutions. The acid solutions were maintained at 25° C. for two hours with stirring. The contents of the cellophane casings were transferred to Pyrex tubes and the tubes were sealed, leaving ten percent of the volume of the tubes unfilled. The sealed tubes were gradually heated and observed for flocculation. The results of the experiments are given below in tabular form.

| Concentration of acid in percent by weight | Ionic strength | Flocculation temperature, ° C. |
|---|---|---|
| 0.05 | 0.05 | 105 |
| 0.05 | 0.1 | 96 |
| 0.05 | 0.2 | 93 |
| 0.05 | 0.03 | 87.5 |
| 0.1 | 0.05 | ¹ 120 |
| 0.1 | 0.1 | ¹ 120 |
| 0.1 | 0.2 | ¹ 120 |
| 0.1 | 0.3 | ¹ 120 |

¹ No flocculation.

Proteinaceous materials may be heat sterilized by forming a complex of the proteinaceous material and a fluoro compound at a pH at which the complex is soluble, heating the solution of the complex to a temperature and for a time such that there is no flocculation of the complex, and until sterilization is effected, and removing the fluoro compound from the sterilized complex solution.

*Example XV*

Cellophane casings, one-half inch in diameter each, containing two cc. of a one percent by weight aqueous bovine serum albumin solution buffered with acetate buffer at a pH of 5.8 and having an ionic strength of 0.1, were each immersed in twenty cc. of an aqueous solution of hexafluoroglutaric acid; the aqueous solutions had the following concentrations in percent by weight: 4.0, 3.0, 2.0, 1.0 and 0.4. The acid solutions were buffered at the same pH and had the same ionic strengths as the albumin solution. The solutions were maintained at a temperature of 25° C. and stirred for two hours in order for eqilibrium to be established and the fluoro compound-albumin complexes formed. The casings were removed from the acid solutions and the content of each was placed in a separate glass tube and heated over a period of two hours during which time the temperature of the solutions was gradually elevated. Flocculation was first observed when the temperature of the solutions were 83° C., 83° C., 81° C., 75° C., and 72° C., respectively.

The viscosity of a solution of a fluoro compound-protein complex is markedly lower than the viscosity of a solution of the same protein, the concentration of protein in both solutions being the same. The following example illustrates the difference in the viscosities of protein solutions and solutions of the same proteins which are complexed with a fluoro acid.

*Example XVI*

The relative viscosity values were determined for a one percent by weight aqueous solution of bovine serum albumin at pH 5.8 and an ionic strength of 0.1 and for a one-tenth percent by weight aqueous solution of ash-free photographic gelatin, at a pH of 7.5 and an ionic strength of 0.1. The relative viscosity values were also determined for the same solutions to which one percent by weight of perfluorocaproic acid had been added and to which one-tenth percent by weight of perfluorocaprylic acid had been added. Ostwald viscosimeters with water times of fifty to sixty seconds were used. The relative viscosity values of the solutions were given below in tabular form.

| Perfluoro aliphatic acid | Bovine serum albumin | Gelatin |
|---|---|---|
| None | 1.06 | 1.18 |
| Perfluorocaproic acid | 1.03 | 1.08 |
| Perfluorocaprylic acid | 1.01 | 1.06 |

The following examples illustrate application of the invention to the separation of proteins by fractional precipitation of fluoro compound-protein complexes.

*Example XVII*

Two grams each of bovine serum albumin, fibrinogen, and bovine gammo-globulin were dissolved in two hundred and fifty ml. of an aqueous solution of a phosphate buffer at a pH of 7.55, and having an ionic strength of 0.2. The protein solution was dialyzed against two liters of a 0.5 percent aqueous solution of perfluorocaprylic acid, buffered with a phosphate buffer at a pH of 7.55 and having an ionic strength of 0.2. Dialysis was continued until equilibrium was reached. Small amounts of aqueous acetate buffer solution having a pH of 4.5 and ionic strength of 0.2 were then added to the protein solution to decrease the pH. At a pH of 7.3, the protein solution became turbid. Addition of acetate buffer solution was continued until the pH was 7.0. The precipitated fluoro acid-protein complex was centrifuged and the precipitate was redissolved in an aqueous phosphate buffer solution having a pH of 7.55. Additional precipitates of fluoro compound-protein complexes were formed and removed in the same manner at a pH of 5.2 and 4.8. Each of the precipitates was removed by centrifugation and redissolved in an aqueous phosphate buffer solution at a pH of 7.55. There was no further precipitation of proteinaceous material upon the addition of acetate buffer solution to the solution obtained from the third centrifugation until the pH reached 4.6. Each of the three solutions containing redissolved precipitate in phosphate buffer solution were dialyzed against an aqueous phosphate buffer solution at a pH of 7.55 until the protein solution was free from perfluorocaprylate ion. The proteins in the solutions were precipitated by the addition of ethanol, filtered and washed thoroughly to remove residual buffer solution, and finally dried in a vacuum oven at 105° C. Paper electrophoresis measurements on the original proteins and on the dialyzed, perfluorocaprylate ion-free proteins obtained by the fractional precipitation showed identical patterns.

The bovine gamma-globulin obtained by the first precipitate weighed 2.0182 grams, the fibrinogen obtained from the second precipitation weighed 1.9943 gm., and the bovine serum albumin obtained from the third precipitation weighed 2.0053 gm.

*Example XVIII*

The pH and ionic strength of 100 ml. of normal human plasma were adjusted to 7.7 and 0.2 respectively, by the addition of aqueous phosphate buffer solution. The plasma solution was dialyzed against one liter of 0.5 percent perfluoro caprylic acid buffered with an aqueous phosphate buffer solution at a pH of 7.7 and having an ionic strength of 0.2. Dialysis was continued until equilibrium was established. Small amounts of an aqueous acetate buffer solution having a pH of 4.3 and an ionic strength of 0.2 was added to the plasma solution. Precipitation of the complex began when the pH of the solution reached 7.30. Additional aqueous acetate buffer was added until the pH of the solution was 6.80. The precipitate formed at this pH was separated by centrifugation. Further adjustment downward of the pH of the protein solution by the addition of aqueous acetate buffer produced protein precipitates at a pH of 6.2, 5.65, 5.5, 5.35, 5.15, and 4.85. Each precipitate was removed by centrifugation and additional aqueous buffer solution was added to the protein solution obtained from each centrifugation. After the removal of the last precipitate, the pH of the solution obtained from the centrifugation was adjusted to 4.7 by the addition of aqueous acetate buffer solution. There was no further precipitation of protein. The eight precipitates obtained were each redissolved in ten ml. of aqueous phosphate buffer solution having a pH of 7.7 and an ionic strength of 0.2. Each solution was placed in a cellophane casing and dialyzed against one hundred cc. of an aqueous phosphate buffer solution having a pH of 7.7 and an ionic strength of 0.2. The solution of the first precipitate obtained showed a paper electrophoresis pattern similar to that of gamma-globulin and amounted to 11.5 percent of the total protein precipitated. The second precipitate showed a paper electrophoresis pattern similar to that of beta-globulin and amounted to 3.3 percent of the total protein precipitated. The third precipitate amounted to 2.8 percent of the total protein precipitated and paper electrophoresis showed this protein to be homogenous. The fourth precipitate amounted to 3.3 percent of the total protein precipitated and paper electrophoresis showed it to be composed of at least two components, probably euglobulins. The fifth precipitate amounted to 0.25 percent of the total protein precipitated and paper electrophoresis showed it to be homogenous. The sixth precipitate amounted to ten percent of the total protein precipitated and electrophoresis showed it to be a mixture, probably lipoproteins. The seventh precipitate amounted to four percent of the total protein precipitated and paper electrophoresis and a precipitin test showed it to be fibrinogen. The eighth precipitate amounted to fifty-five percent of the total protein present in the plasma solution. Precipitin tests demonstrated this protein fraction to be identical with human serum albumin obtained by other methods.

Various types of contaminants may be removed from proteins by forming a complex of the protein with a fluoro compound. The affinity of perfluoro compound ions for a protein is of such a strong order that many contaminants bound to the protein are displaced by fluoro compound ions. Water soluble contaminants may be removed from proteins by the addition to the protein solution of fluoro compound ions while the pH of the protein solution is buffered in a region in which the fluoro compound-protein complex formed is precipitated or in a region in which the complex is soluble followed in the latter case by adjustment of the pH to a region in which the complex is precipitated. Precipitated fluoro compound-protein complex may be separated from a solution of the water soluble contaminant, washed to remove any occluded contaminant and redissolved in an aqueous buffer solution and the fluoro compound removed by dialysis, dilution or ion exchange resin. The purified protein obtained in this manner is undenatured. This procedure has particular application in the isolation of the protein portions of mucoproteins and nucleoproteins. Water insoluble contaminants may be removed from proteins by the addition of fluoro compound ions to protein solutions in a pH region in which the fluoro compound-protein complex is soluble. The water soluble contaminant is displaced from the protein, by the fluoro compound and precipitated. A contaminant-free solution of undenatured protein can be obtained upon the removal of the bound fluoro compound ions from the fluoro compound-protein complex. This procedure has particular application in the purification of gamma-globulins, enzymes, antitoxins, and viruses.

The following examples illustrate the application of the invention to the purification of proteins.

*Example XIX*

Ten ml. of a two percent aqueous bovine gamma-globulin solution, buffered at a pH of 5.8 with aqueous acetate buffer and having an ionic strength of 0.1 were placed in a cellophane casing one-half inch in diameter. The casing was immersed in 200 ml. of an aqueous 0.1 percent solution of perfluorocaproic acid, buffered at a pH of 5.8 with acetate buffer and having an ionic strength of 0.1. The flask containing the solution of perfluorocaprylic acid was maintained at a temperature of 25° C. and shaken for two hours. The solution of fluoro compound-protein complex formed was removed from the cellophane casing and centrifuged and the centrifugate was dialyzed against 500 cc. of an aqueous acetate buffer solution, having a pH of 5.8 and an ionic strength of 0.1. The perfluorocaprylate ion-free bovine gamma-globulin in the solution had an electrophoresis pattern much sharper than the electrophoresis pattern of the original bovine gamma-globulin.

*Example XX*

One-tenth gram of a commercial urease preparation was dissolved in ten cc. of an aqueous citrate buffer solution, having a pH of 6.0. The cloudy enzyme solution was centrifuged. The addition of urea to one cc. of the centrifugate resulted in the evolution of eight micromols of carbon dioxide. Sufficient perfluorocaprylic acid was added to one cc. of the urease solution to make the acid concentration 0.1 percent by weight. Carbon dioxide was not produced on the addition of urea to this solution. Perfluorocaprylic acid was added to another one cc. portion of the centrifuged buffered urease solution to bring the concentration with respect thereto to 0.1 percent by weight and the solution of perfluorocaprylic acid-urease complex formed was centrifuged. The centrifugate was placed in a cellophane casing and dialyzed against an aqueous phosphate buffer solution having a pH of 6.0. The dialyzed urease solution was free from perfluorocaprylate ion and was finally centrifuged to remove a slight residue present after dialysis. Addition of urea to the final centrifugate resulted in the evolution of 9.6 micromols of carbon dioxide.

The amount of fluoro aliphatic acid required to complex with and form a precipitate of fluoro aliphatic acid-protein complex with a unit amount of protein and at a pH at or below the isoelectric point of the protein decreases with an increase in the length of the carbon chain of the fluoro aliphatic acid. When the amount of fluoro aliphatic acid present in a protein solution, which is at a pH below the isoelectric point of the protein, is insufficient to result in precipitation of the fluoro aliphatic acid-protein complex formed, the complex is more sensitive to flocculation at an elevated temperature than the uncomplexed protein; the complex will flocculate in this case at a lower temperature than the flocculation temperature of the uncomplexed protein. For ratios of fluoro aliphatic acid to protein at which the complex is not precipitated, the pH of the solution being at or below the isoelectric point of the protein, an increase in the amount of fluoro aliphatic acid complexed with protein results in a decrease in the flocculation temperature of the complex.

The following examples illustrate the effect on the flocculation temperature of bovine serum albumin of increasing amounts of perfluoro caproic acid, the amount of acid being below the amount required to form a precipitated complex.

*Example XXI*

A series of cellophane casings, one-half inch in diameter, each containing two cc. of a one percent by weight aqueous bovine serum albumin solution, buffered with an acetate buffer at a pH of 4.85 and having an ionic strength of 0.1, were each immersed in a flask containing twenty cc. of a perfluorocaproic acid aqueous solution buffered at a pH of 4.85 with acetate buffer and having an ionic strength of 0.1, the flasks containing the acid in increasing concentration. The flasks containing the acid solution and the cellophane casings were maintained at a temperature of 25° C. and shaken for two hours. The dialysate was analyzed for perfluoro caproate ion by measurement of the surface tension, the difference in free ion and original ion concentration present in the dialysate being the amount of perfluoro caproate ion complexed with the bovine serum albumin. The contents of each cellophane casing were transferred to a glass tube, the temperature of the solution in each tube was gradually raised and the solutions were observed for flocculation. The results of the experiments are given below in tabular form.

| Concentration of acid in mols per liter | Bound acid-protein mol ratio | Flocculation temperature |
|---|---|---|
| 0.0029 | 18.2-1 | 70 |
| 0.0058 | 38.5-1 | 65 |
| 0.0116 | 79-1 | 59 |
| 0.0174 | 111-1 | 54 |
| 0.0232 | 143-1 | 52 |
| 0.029 | 177-1 | 50 |

*Example XXII*

The series of experiments of Example XXI was repeated except that the bovine serum albumin and perfluorocaproic acid solutions were buffered at a pH of 5.8. The results of the experiments of this example are given below in tabular form.

| Concentration of acid in mols per liter | Bound acid-protein mol ratio | Flocculation temperature |
|---|---|---|
| 0.0029 | 18.7-1 | 83 |
| 0.0058 | 39.5-1 | 86 |
| 0.0116 | 80-1 | 90 |
| 0.0174 | 119-1 | 92 |
| 0.0232 | 157-1 | 92 |
| 0.029 | 182-1 | 92 |

The phenomenon illustrated in Examples XXI and XXII may be employed to obtain a protein in purified form by removing a contaminating proteinaceous material, providing the contaminant has an isoelectric point above that of the desired protein. Thus, an amount of a perfluoro aliphatic acid, preferably having four to six carbon atoms, insufficient to form a precipitated complex of the contaminant may be added to a solution of the contaminated protein, the pH of the protein solution being buffered at a value below the isoelectric point of the contaminant and above the isoelectric point of the desired protein, and heating the solution of the complexed proteins results in flocculation of the complex of the contaminant. The contaminant free desired protein may then be obtained from the solution after removal of the flocculated complex.

Many quantities and details of procedure may be varied substantially without departing from the principles of this invention and it is therefore to be understood that the scope of the patent granted on this invention is not to be limited otherwise than necessitated by the scope of the appended claims. Thus, the principles of this invention have been demonstrated in the foregoing examples with various classes of proteins including human and lower animal serum albumins, globulins, fibrinogens, egg albumins and albuminoids, and members of these classes; such as, for example, bovine serum albumin, bovine gamma globulin, beta lactoglobulin, human plasma, serum albumin, fibrinogen, ovalbumin, egg albumin, and gelatin. It will be apparent that these principles are applicable to other proteinaceous materials having properties similar to those of the above-enumerated proteins.

This application is a continuation-in-part of my application Serial No. 636,509, filed January 28, 1957, now abandoned, which is, in turn, a continuation-in-part of my application Serial No. 456,330, filed September 15, 1954, now abandoned.

I claim:
1. A method for protecting proteinaceous materials from heat and chemical denaturation comprising: forming an aqueous solution of a water soluble proteinaceous material; adding to said solution a fluoro compound selected from the group consisting of perfluoroalkanoic acids containing from 2 to 12 carbon atoms, omegahydroperfluoroalkanoic acids containing from 2 to 12 carbon atoms, chloroperfluoroalkanoic acids containing from 2 to 12 carbon atoms, alpha-dihydroperfluoroalkanols containing from 2 to 12 carbon atoms, fluoroalkyl sulfonates containing from 2 to 12 carbon atoms, fluoroalkyl sulfates containing from 2 to 12 carbon atoms, fluoroalkyl sulfonic acids containing from 2 to 12 carbon atoms, alpha-dihydroperfluoroalkyl amines containing from 2 to 12 carbon atoms, alkali metal and ammonium mono- and di-(trihydroperfluoroalkyl) phosphates, the alkali metal and ammonium salts of said acids, alcohols and sulfonates, and the hydrochloride, hydrobromide, sulfate and phosphate salts of said amines; and adjusting the pH of said solution so that the net ionic charge on the proteinaceous material is of the same sign as the charge on the fluoro containing ion formed in solution by the fluoro compound, whereby the fluoro compound is bound to said proteinaceous material and a solution of a fluoro compound-protein complex is formed.

2. A method for protecting proteinaceous materials from heat and chemical denaturation comprising; forming an aqueous solution of a water soluble proteinaceous material, adding to said solution a perfluoroalkanoic acid containing from 2 to 12 carbon atoms, and adjusting the pH of said solution to above the isoelectric point of said protein whereby the fluoro compound is bound to said proteinaceous material and a solution of a fluoro compound-protein complex is formed.

3. A method according to claim 2 in which the perfluoroalkanoic acid is perfluoro caproic acid.

4. A method according to claim 2 in which the perfluoroalkanoic acid is perfluoro caprylic acid.

5. A method according to claim 2 in which the perfluoroalkanoic acid is perfluoro capric acid.

6. A method for protecting proteinaceous materials from heat and chemical denaturation comprising; forming an aqueous solution of a water soluble proteinaceous material, adding to said solution a perfluoroalkanol containing from 2 to 12 carbon atoms, and adjusting the pH of said solution to above the isoelectric point of said protein, whereby the fluoro compound is bound to said proteinaceous material and a solution of a fluoro compound-protein complex is formed.

7. A method for protecting proteinaceous materials from heat and chemical denaturation comprising; forming an aqueous solution of a water soluble proteinaceous material, adding to said solution a perfluoroalkyl amine containing from 2 to 12 carbon atoms, and adjusting the pH of said solution to below the isoelectric point of said protein, whereby the fluoro compound is bound to said proteinaceous material and a solution of a fluoro compound-protein complex is formed.

8. An aqueous solution of a fluoro compound and a water soluble proteinaceous material, said solution having a pH in the region in which the fluoro compound carries a charge of the same sign as the residual charge on the proteinaceous material and a relative viscosity below the relative viscosity of a corresponding aqueous solution of only said proteinaceous material, said fluoro compound being selected from the group consisting of perfluoroalkanoic acids containing from 2 to 12 carbon atoms, omegahydroperfluoroalkanoic acids containing from 2 to 12 carbon atoms, chloroperfluoroalkanoic acids containing from 2 to 12 carbon atoms, alpha-dihydroperfluoroalkanols containing from 2 to 12 carbon atoms, fluoroalkyl sulfonates containing from 2 to 12 carbon atoms, fluoroalkyl sulfates containing from 2 to 12 carbon atoms, fluoroalkyl sulfonic acids containing from 2 to 12 carbon atoms, alpha-dihydroperfluoroalkyl amines containing from 2 to 12 carbon atoms, alkali metal and ammonium mono- and di-(trihydroperfluoroalkyl) phosphates, and alkali metal and ammonium salts of said acids, alcohols and sulfonates, and the hydrochloride, hydrobromide, sulfate and phosphate salts of said amines.

9. An aqueous solution of a fluoro compound and a water soluble proteinaceous material which is resistant to denaturation at an elevated temperature and in the presence of a potentially protein denaturing chemical in said solution, said solution having a pH above the isoelectric point of said proteinaceous material and a relative viscosity below the relative viscosity of a corresponding aqueous solution of only said proteinaceous material, said fluoro compound being a perfluoro alkanoic acid containing from 2 to 12 carbon atoms.

10. A solution according to claim 9 in which the fluoro compound is perfluoro caproic acid.

11. A solution according to claim 9 in which the fluoro compound is perfluoro caprylic acid.

12. A solution according to claim 9 in which the fluoro compound is perfluoro capric acid.

13. A method for isolating proteinaceous materials in a highly purified and undenatured form, comprising the steps of adding a compound selected from the group consisting of perfluoroalkanoic acids containing from 2 to 12 carbon atoms, omegahydroperfluoroalkanoic acids containing from 2 to 12 carbon atoms, chloroperfluoroalkanoic acids containing from 2 to 12 carbon atoms, alpha-dihydroperfluoroalkanols containing from 2 to 12 carbon atoms, fluoroalkyl sulfonates containing from 2 to 12 carbon atoms, fluoroalkyl sulfates containing from 2 to 12 carbon atoms, fluoroalkyl sulfonic acids containing from 2 to 12 carbon atoms, alpha-dihydroperfluoroalkylamines containing from 2 to 12 carbon atoms, alkali metal and ammonium mono- and di-(trihydroperfluoroalkyl) phosphates, the alkali metal and ammonium salts of said acids, alcohols and sulfonates, and the hydrochloride, hydrobromide, sulfate and phosphate salts of said amines, to a solution of at least one water soluble proteinaceous material, whereby the fluoro-compound is bound to the proteinaceous material and a fluoro compound-protein complex is formed, adjusting the pH of the solution of the complex to substantially the isoelectric point of the protein whereby the complex is precipitated, separating the precipitate, and removing the bound fluoro-compound from the fluoro-compound-protein complex.

14. A method according to claim 17 in which the fluoro-compound is perfluoro caproic acid.

15. A method according to claim 17 in which the fluoro-compound is perfluoro caprylic acid.

16. A method according to claim 17 in which the fluoro-compound is perfluoro capric acid.

17. A method for isolating proteinaceous materials in a highly purified and undenatured form, comprising the steps of: adding a perfluorinated alkanoic acid having at least four carbon atoms to a solution of at least one proteinaceous material, whereby the fluoro compound is bound to the proteinaceous material and a fluoro compound-protein complex is formed, adjusting the pH of the solution of the complex to substantially the isoelectric point of the protein whereby the complex is precipitated, separating the precipitate, and removing the bound fluoro compound from the fluoro compound-protein complex.

References Cited in the file of this patent

UNITED STATES PATENTS

| | | |
|---|---|---|
| 2,919,998 | Klevens et al. | Jan. 5, 1960 |
| 2,919,999 | Reissmann et al. | Jan. 5, 1960 |

OTHER REFERENCES

Boyer et al.: Journal of Biol. Chem. 162, pages 181–198, 1946.

Stacey: Faraday Society, Discussions, No. 13, pages 245–251, 1953.

Katz: Nature 174, page 509, 1954.

Klevens et al.: Protein-Fluoroacid Interaction, Faraday Society Discussions, volume 18, pages 277–288, 1954.

Klevens, H. B.: Formation of Complexes of Fluorocarbons etc. With Proteins etc., Nature, volume 176, pages 879–880, 1955.